United States Patent
Wilke et al.

(10) Patent No.: US 6,554,360 B1
(45) Date of Patent: Apr. 29, 2003

(54) SEAT

(75) Inventors: Hans-Joachim Wilke, Dornstadt-Bollingen (DE); Hermann Meiller, Wernberg-Köblitz (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 09/807,153

(22) PCT Filed: Oct. 9, 1999

(86) PCT No.: PCT/DE99/03361

§ 371 (c)(1),
(2), (4) Date: Jun. 1, 2001

(87) PCT Pub. No.: WO00/21787

PCT Pub. Date: Apr. 20, 2000

(30) Foreign Application Priority Data

Oct. 14, 1998 (DE) .................................. 198 47 307

(51) Int. Cl.⁷ .................................................. A47C 1/02
(52) U.S. Cl. ..................................... 297/342; 297/284.4
(58) Field of Search .................. 297/284.1, 284.4, 297/342, 341, 318, 317, 320

(56) References Cited

U.S. PATENT DOCUMENTS

| | | | |
|---|---|---|---|
| 2,558,171 A | * | 6/1951 | Chesley |
| 3,712,666 A | | 1/1973 | Stoll .......................... 297/61 |
| 4,040,661 A | * | 8/1977 | Hogan et al. |
| 4,560,199 A | | 12/1985 | Sapper ....................... 297/323 |
| 5,472,261 A | * | 12/1995 | Oplenskdal et al. |

FOREIGN PATENT DOCUMENTS

| | | |
|---|---|---|
| DE | 4116836 | 11/1992 |
| DE | 19534660 | 2/1997 |
| EP | 270699 | 6/1988 |
| FR | 2692209 | 12/1993 |
| WO | WO 95/22307 | 8/1995 |

* cited by examiner

Primary Examiner—Milton Nelson, Jr.
(74) Attorney, Agent, or Firm—Elliot M. Olstein; Raymond J. Lillie

(57) ABSTRACT

Described is a seat (10) comprising a seat squab (12) and a backrest (14) which is displaceable in respect of its inclination. In order to achieve a load relief for the intervertebral disc of a user of the seat and thus optimum seating comfort, the seat (10) provides that the backrest (14) is displaceable between convex lordosis positions and concave kyphosis positions in dependence on the respective backrest inclination.

3 Claims, 7 Drawing Sheets

SEAT

Figure 1:
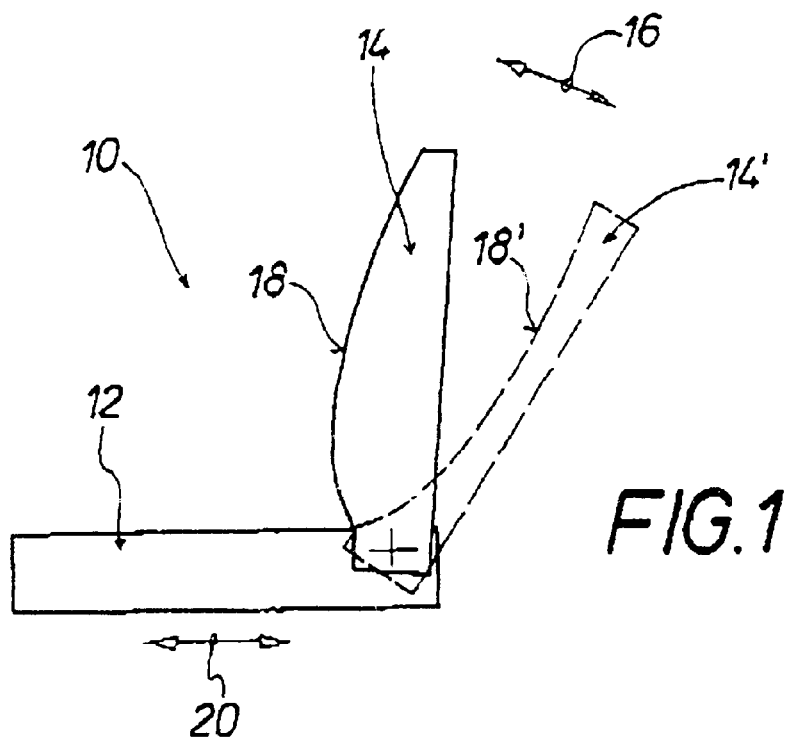

The invention concerns a seat comprising a seat squab and a backrest which is adjustable in respect of its inclination.

Such a seat involves for example a vehicle seat for a land vehicle, aircraft or marine craft, or a chair such as an office chair or the like.

Hitherto it was assumed that, when a person is sitting, the person should adopt an upright position with a hollow back (lordosis). A large number of proposals have been put forward in that respect. By way of example WO 95/22307 describes a seat having a backrest, wherein lordosis can be adjusted and displaced as desired.

A seat which is adjustable in respect of lordosis, in particular a vehicle seat, is also known for example from DE 195 34 660 C1. That known seat has a backrest with a number of pressure-actuable air chambers which are communicated with a control unit for controlling the pressure in the air chambers. The control unit is connected to an operating unit which is actuable by a user of the seat in order to adjust the contour or the lordosis of the backrest of the seat, as desired. With that known seat, the seat contour can be selectively curved forwardly in the upper, middle or lower portion of the lordosis region, by way of expansion of a respectively corresponding air chamber, as is described at column 4, lines 31 through 34.

DE 41 16 836 A1 describes a vehicle seat having a mechanical massage device and EP 0 270 699 B1 discloses a vehicle seat with air chambers for dynamic massage of the spinal column of a user of the seat, wherein the backrest is adapted to the S-shaped curvature of the spinal column of a user of the seat. This last-mentioned seat therefore also only takes account of lordosis.

Recent investigations however, on the basis of direct in-vivo intervertebral disc pressure measurements, show that the ideas which applied hitherto of sitting upright with a hollow back can no longer be sustained. In accordance with these most recent findings, sitting is no more stressful than standing, in which respect when sitting the pressure in the intervertebral discs in the seated posture with a round back (=kyphosis), which hitherto was frowned upon as being casual and lax, is even reduced to half. The comfortable seated posture with a slightly round back produces a markedly lower level of pressure loading than the upright posture with a rounded back (=lordosis) which was hitherto recommended by the back experts.

In consideration of those aspects the object of the present invention is to provide a seat of the kind set forth in the opening part of this specification, with which it is not only possible to adopt a hollow-back position but also a rounded-back position in order to correspondingly relieve the load on the intervertebral discs of the user of the seat.

In accordance with the invention, in a seat of the kind set forth in the opening part of this specification, that object is attained in that the backrest is displaceable between convex lordosis positions and concave kyphosis positions in dependence on the respective backrest inclination.

The configuration according to the invention of the seat with a backrest which is displaceable between convex lordosis positions and concave kyphosis positions in dependence on the respective inclination of the backrest affords the advantage that the spinal column of the respective user of the seat can be actively adapted to hollow-back and rounded-back positions. That provides for a changing pressure loading in respect of the intervertebral discs. As a consequence of that changing pressure loading, the advantage is enjoyed that the intervertebral disc is nourished as a consequence of its "sponge principle".

In the case of the seat according to the invention, it has proven to be desirable if the backrest in a steeply inclined setting is set curved convexly forwardly into an associated lordosis position and in a shallowly inclined position is set curved concavely rearwardly into an associated kyphosis position. That provides that the respective user of the seat assumes a hollow-back configuration in the corresponding upright position of the seat and a rounded-back configuration in a flatter position. It will be appreciated that it is also possible to provide for a kyphosis position in a steeply inclined position and a lordosis position in a flatly inclined position.

In the case of the seat according to the invention the seat squab can be stationary, that is to say non-adjustable. It is however also possible for the seat squab to be displaceable in the longitudinal direction of the seat and for the backrest to be displaceable in respect of its inclination and thus between lordosis and kyphosis settings, in dependence on the longitudinal seat squab setting. That provides an increase level of seat comfort, in comparison with a seat according to the invention with a seat squab which is not displaceable. In the case of a seat of the last-mentioned kind, it has proven to be advantageous if the backrest, in a set-back position of the seat squab, is set steeply inclined into a corresponding lordosis position and, in a set-forward position of the seat squab, the backrest is set in a shallowly inclined condition into a kyphosis position. That can take even better account of the anatomical aspects of seat users of different sizes.

Likewise it is possible for the seat squab to be displaceable in respect of its inclination and for the backrest to be displaceable in respect of its inclination and thus between lordosis and kyphosis positions, in dependence on the inclination of the seat squab. In a seat of the last-mentioned kind in a shallow position of inclination of the seat squab the backrest can be set in a steeply inclined condition into an associated lordosis position and in a forwardly upwardly inclined position it can be set in a shallowly inclined condition into an associated kyphosis position. This also makes it possible to take account of the anatomical factors of various users of the seat.

A still more improved seat with enhanced seat comfort is afforded if the seat squab is displaceable in the longitudinal direction of the seat and simultaneously in respect of its inclination and therewith the backrest is displaceable between corresponding lordosis and kyphosis positions.

In the case of the seat according to the invention the backrest can be displaceable statically between lordosis and kyphosis positions. As already stated above, that not only provides for an alternating pressure loading in the intervertebral disc, but it also provides for nutrition for the intervertebral disc as a consequence of its "sponge principle". It can be desirable if, in the seat according to the invention, the backrest is displaceable dynamically between lordosis and kyphosis positions in order not only to provide a desired pressure relief effect for the intervertebral disc as well as nutrition therefor, but also to provide a massage effect. All that has a correspondingly positive effect in terms of seat comfort.

Figure 2:
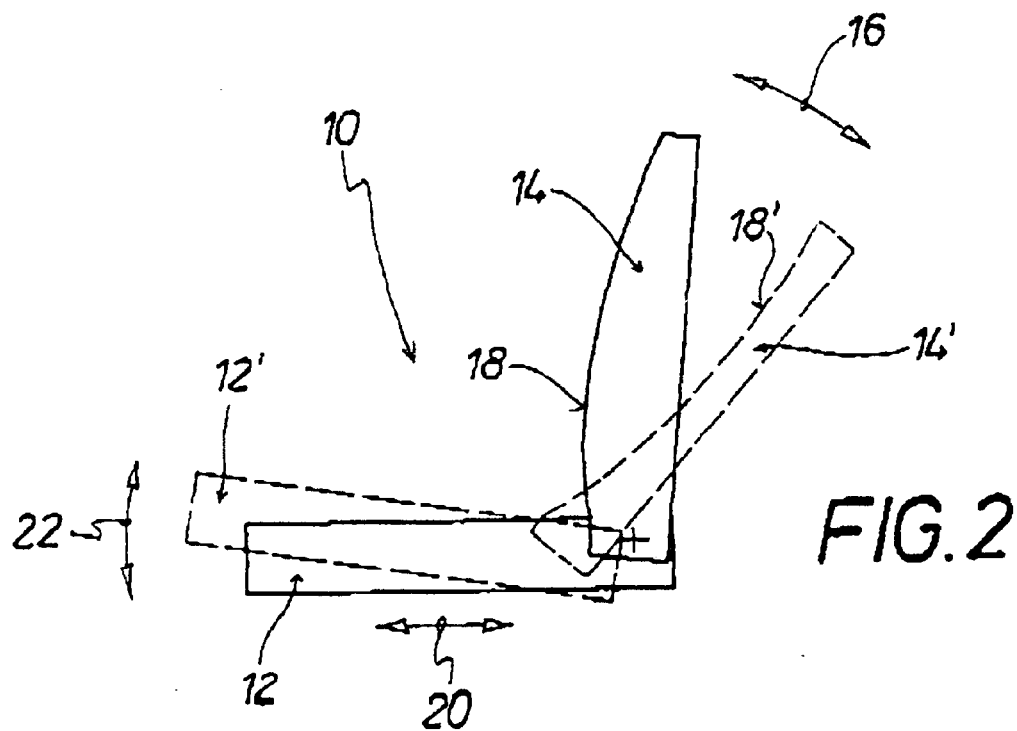
Figure 3:
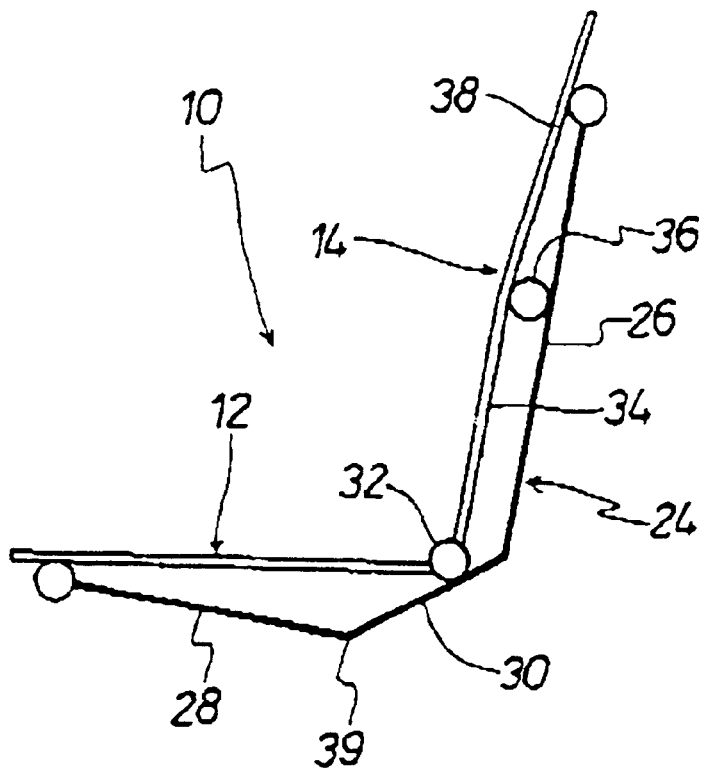
Figure 4:
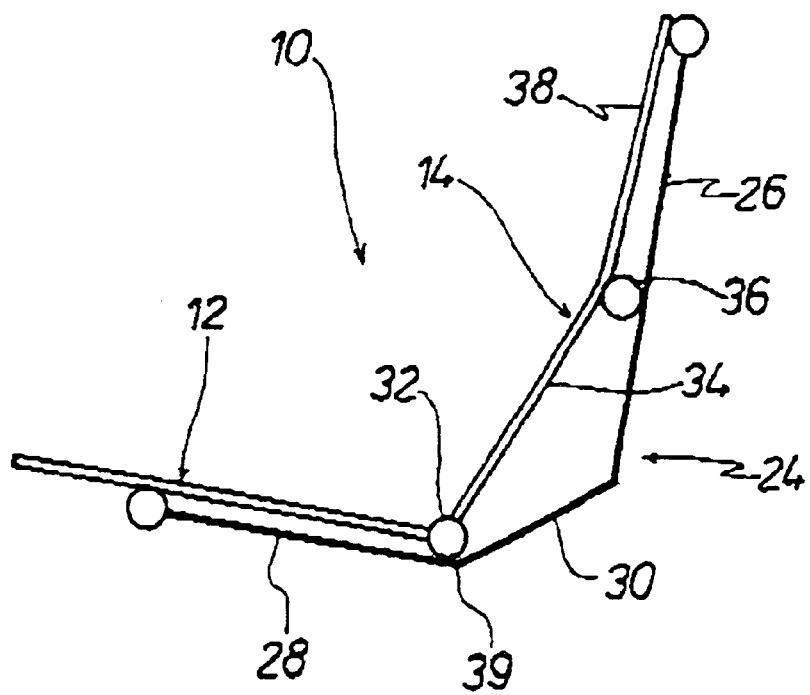
Figure 5:
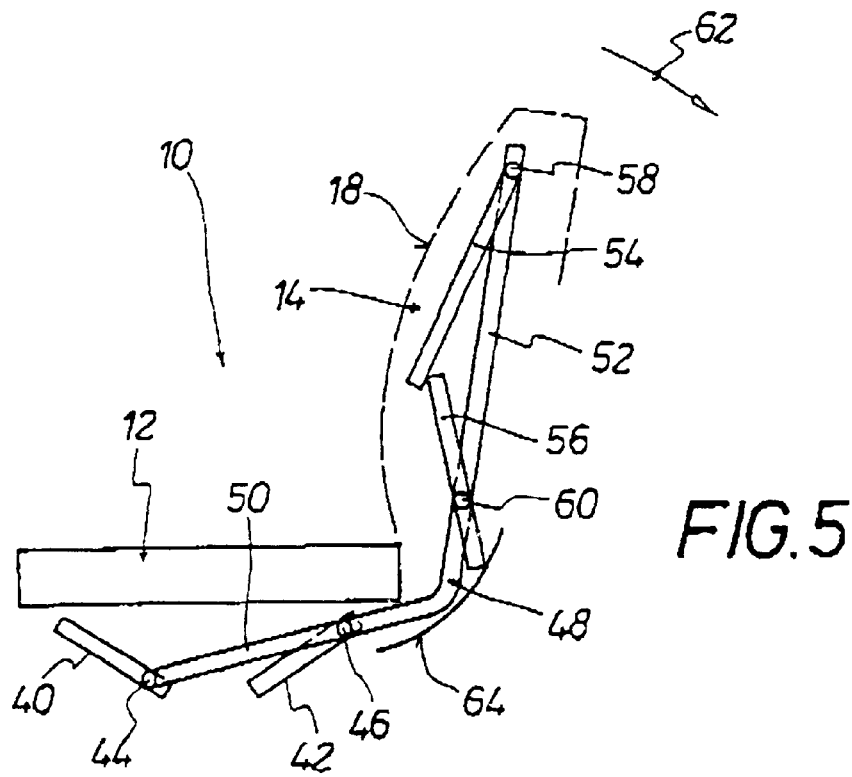
Figure 6:
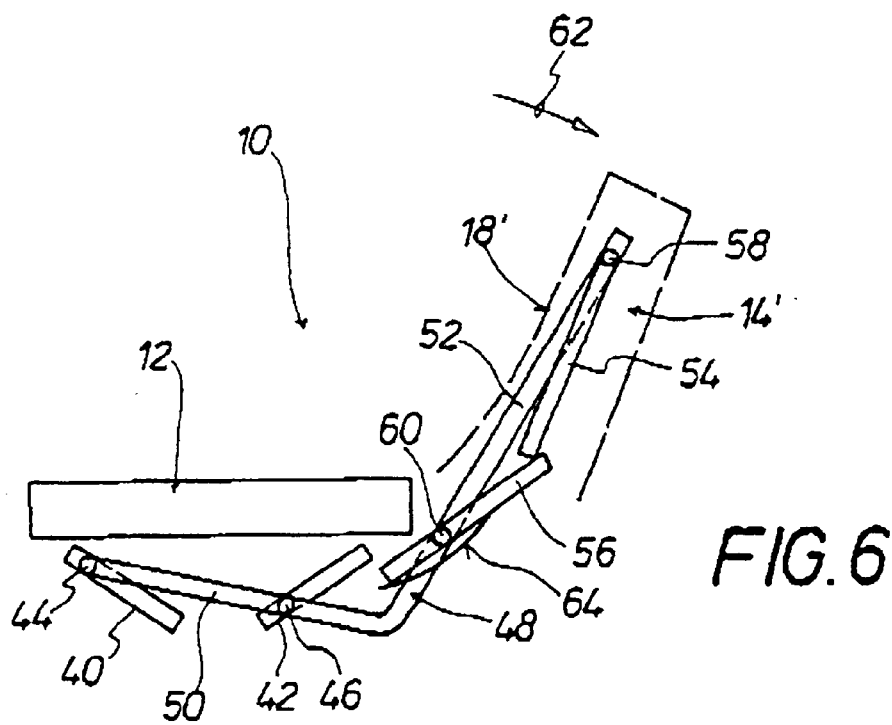
Figure 7:
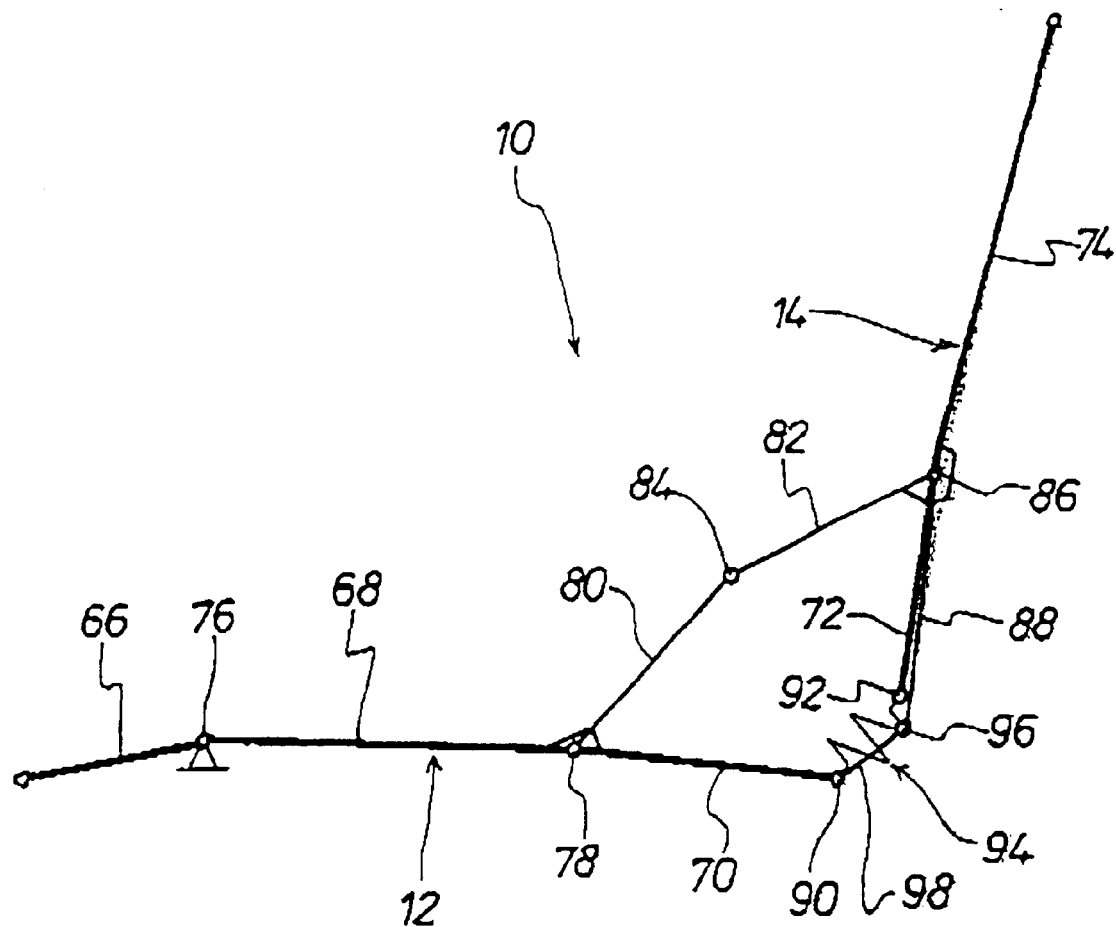
Figure 8:
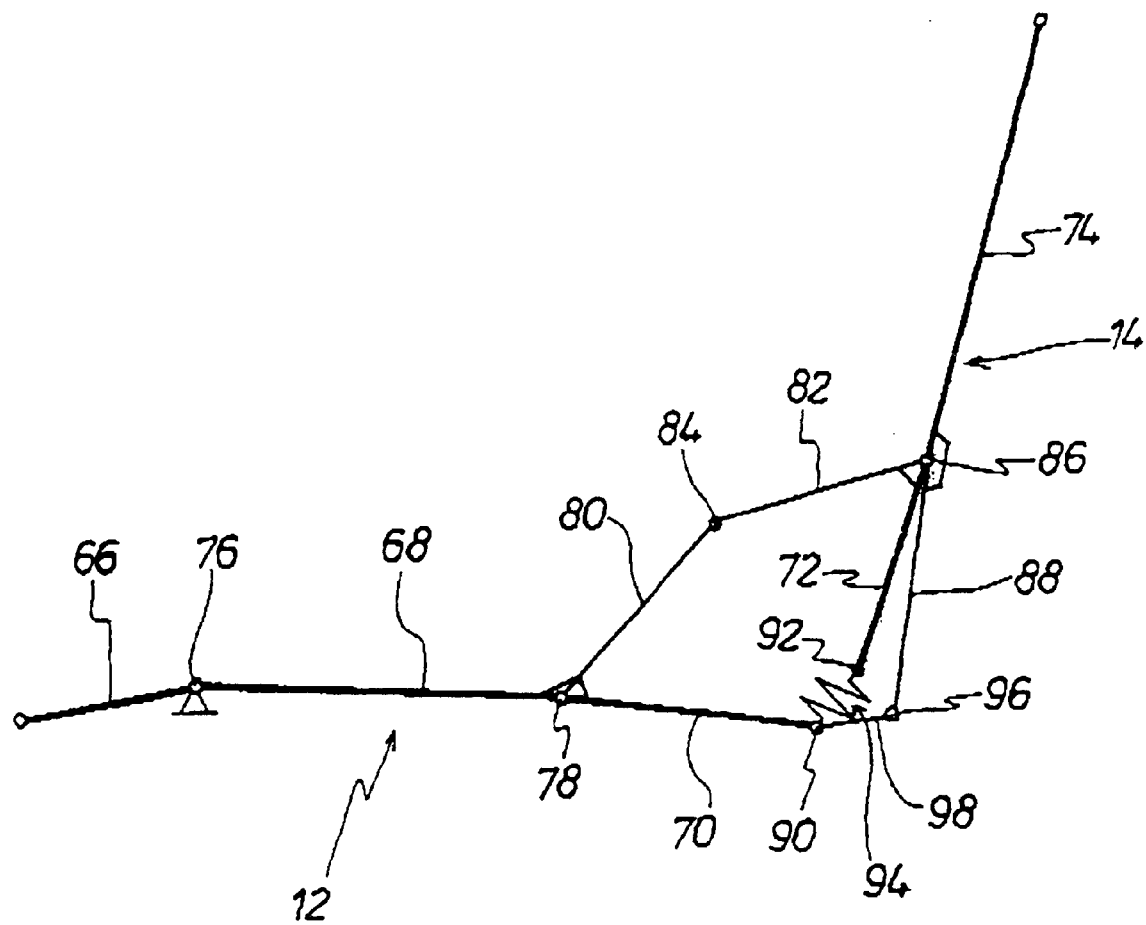
Figure 9:
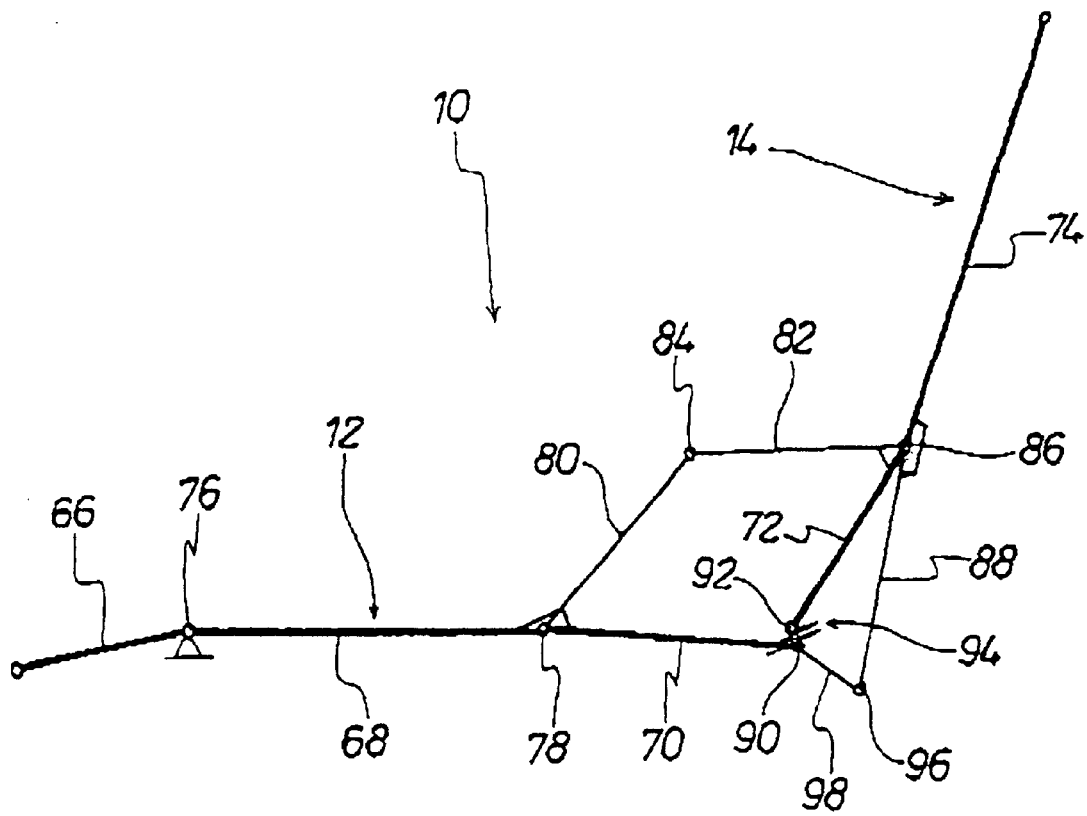
Figure 10:
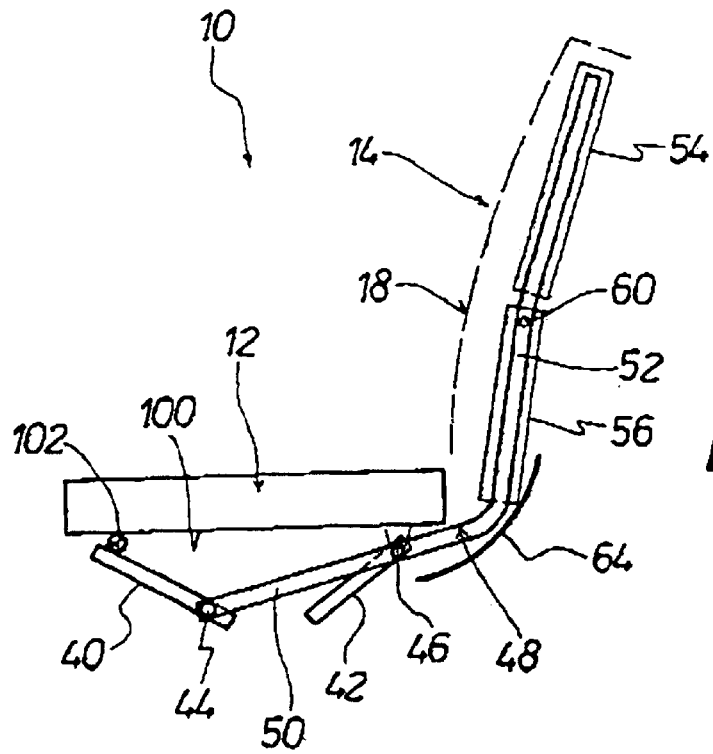
Figure 11:
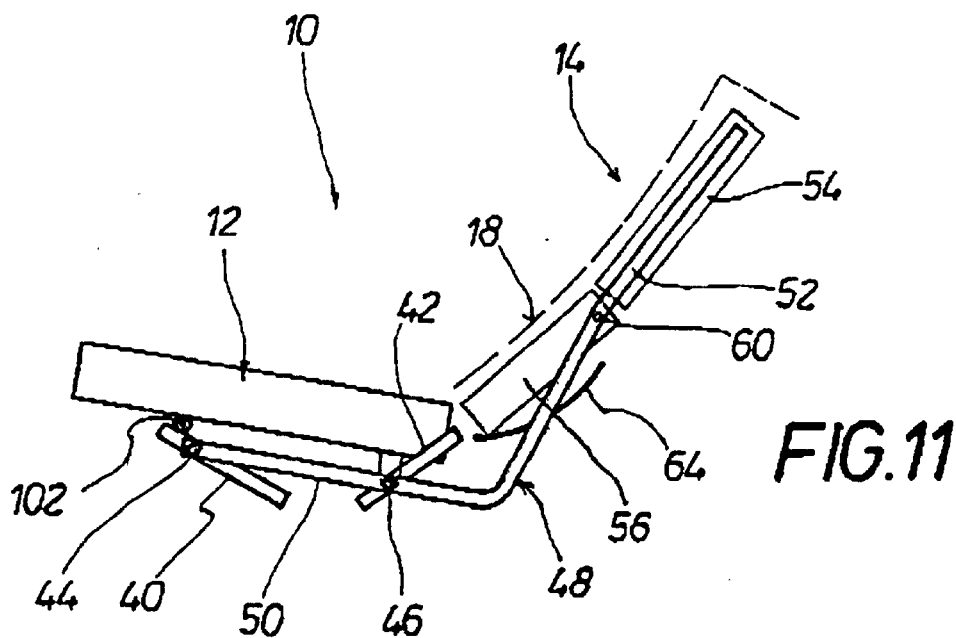

Further details, features and advantages are apparent from the description hereinafter of embodiments of the seat according to the invention which are diagrammatically illustrated in the drawing in which:

FIG. 1 shows a first embodiment of the seat with a non-displaceable seat squab and a backrest which is displaceable in terms of its inclination, FIG. 2 is a diagrammatic side view similar to FIG. 1 of a seat with a displaceable seat squab and a backrest which is displaceable in dependence on the displacement of the seat squab, FIG. 3 is a diagrammatic side view of a seat with a rigid base frame structure and a seat squab which is displaceable with respect thereto and a backrest in a lordosis position, FIG. 4 shows the seat of FIG. 3 in a kyphosis position, FIG. 5 diagrammatically shows an embodiment of the seat illustrated in FIG. 1 with a stationary seat squab, with the backrest assuming a lordosis position, FIG. 6 shows the seat of FIG. 5, with the backrest assuming a kyphosis position, FIG. 7 diagrammatically shows a further embodiment of the seat corresponding to the seat shown in FIG. 1 with a stationary seat squab, with the backrest assuming a lordosis position, FIG. 8 shows the seat of FIG. 7, with the backrest assuming an intermediate position between the lordosis position shown in FIG. 7 and a kyphosis position as shown in FIG. 9, FIG. 9 shows the seat illustrated in FIGS. 7 and 8, wherein the backrest assumes a kyphosis position, FIG. 10 is a view similar to FIG. 5 of a seat, wherein the seat squab is adjustable in the longitudinal direction of the seat and in respect of its inclination, and FIG. 11 shows the seat illustrated in FIG. 10, with the backrest assuming a kyphosis position.

FIG. 1 is a diagrammatic side view of a seat 10 comprising a seat squab 12 and a backrest 14. The backrest 14 is displaceable in terms of its inclination, with respect to the seat squab 12. This is indicated by the arcuate arrow 16. The backrest 14 is identified by solid lines in a steep inclined setting and with thin broken lines in a shallow inclined setting, and identified by reference numeral 14'. In the steep inclined position, the front surface 18 of the backrest 14 is set convexly outwardly into a lordosis position. In the shallow inclined position the front surface 18' of the backrest 14 assumes a concavely rearwardly curved kyphosis position.

The seat squab 12 of the seat 10 illustrated in FIG. 1 can be arranged stationarily, that is to say non-displaceably. In another embodiment of the seat 10 however the seat squab 12 can also be displaceable with a reciprocating movement in the longitudinal direction of the seat. That is indicated by the double-headed arrow 20 in FIG. 1. In this case the backrest 14 can be displaceable in dependence on the linear setting of the seat squab 12 in the longitudinal direction of the seat or independently of that longitudinal setting.

FIG. 2 shows an embodiment of the seat 10 in which the seat squab 12 is adjustable in the longitudinal direction of the seat and at the same time in respect of its inclination. Displacement of the seat squab 12 in the longitudinal direction of the seat is again indicated by the double-head arrow 20. The inclined setting of the seat squab 12 is indicated by the arcuate double-head arrow 22. In the case of the seat shown in FIG. 2 the seat squab 12 can be displaceable in the longitudinal direction of the seat and in respect of inclination independently of each other or in dependence on each other.

In the position of the seat squab 12 which is shown in solid lines in FIG. 2 the backrest 14 assumes a steep inclined setting. In the position of the seat squab which is identified by reference numeral 12' and indicated by thin broken lines, being the position in which the seat squab is set forwardly in the longitudinal direction of the seat and raised at the front in an inclined condition, the backrest which is identified with thin broken lines and which bears reference numeral 14' assumes a shallow inclined position. In the steep inclined position of the backrest 14 the front surface 18 thereof is curved convexly forwardly in order to assume a lordosis position. In the shallow inclined position the front surface 18' of the backrest 14' is curved concavely rearwardly and assumes a rounded-back position, that is to say a kyphosis position.

FIGS. 3 and 4 diagrammatically show an embodiment of the seat 10—similarly to the seat 10 shown in FIG. 2—wherein a rigid base frame structure 24 of the seat 10 is combined with a seat squab 12 and a backrest 14 in such a way that, in the rearwardly displaced and slightly inclined position of the seat squab 12 the backrest is inclined steeply and assumes a forwardly convexly curved lordosis position (see FIG. 3). When the seat squab 12 is displaced forwardly and upwardly at the front the backrest 14 assumes a shallow inclined position and is set in a rearwardly curved kyphosis position (see FIG. 4). For that purpose the rigid base frame structure 24 has for example a backrest portion 26, a seat squab portion 28 and a connecting portion 30 which connects the backrest portion 26 to the seat squab portion 28. The backrest 14 has a buttocks portion 34 which is adjacent to the seat squab 12 and which is pivotably connected thereto by means of a pivot 32, and a shoulder portion 38 which is pivotably connected to the buttocks portion 34 by means of a pivot 36.

In the lordosis position which is diagrammatically shown in FIG. 3, the pivot 32 between the seat squab 12 and the backrest 14 is in the region of the connecting portion 30 of the rigid base frame structure 24 of the seat 10. In the kyphosis position of the backrest 14 diagrammatically shown in FIG. 4, the pivot 32 is in the transitional region 39 between the seat squab portion 28 and the connecting portion 30 of the rigid base frame structure 24 of the seat 10. By virtue of displacement of the seat squab 12 in the longitudinal direction of the seat the inclination of the seat squab 12 and the backrest 14 is automatically reciprocated between the lordosis position (see FIG. 3) and the kyphosis position (see FIG. 4). That can be effected statically, that is to say by so-to-speak one-off displacement as desired, or dynamically, that is to say with a reciprocating motion.

FIGS. 5 and 6 show a further embodiment of the seat 10 in a lordosis position (see FIG. 5) of the backrest 14 and in a kyphosis position (see FIG. 6) of the backrest 14. In this case the seat squab 12 can be for example stationary, that is to say immovable, similarly to the embodiment of FIG. 1. Linear guides 40 and 42 are combined with the seat squab 12. A guide member 44 is linearly movably guided along the linear guide 40 and a guide member 46 is linearly movably guided along the linear guide 42. The guide members 44 and 46 are provided on a frame portion 48 which extends with a seat portion 50 under the seat squab 12 and which has a backrest portion 52. Two backrest parts 54 and 56 are mounted to the backrest portion 52 pivotably about associated pivot axes 58 and 60. When the frame portion 48 is in the position diagrammatically shown in FIG. 5, the backrest parts 54 and 56 assume a position such that the backrest 14 indicated in broken line assumes with its front surface 18 a lordosis position. In comparison, in the position indicated in FIG. 6, the backrest parts 54 and 56 assume a rearwardly angled position so that the backrest 14' indicated in broken lines, with its front surface 18', assumes a rearwardly concavely curved kyphosis position.

In order to pivot the backrest part 56 from the position indicated in FIG. 5 into the rearwardly pivoted position about the pivot axis 60 in the rearward pivotal movement of the backrest 14 which is indicated by the arcuate arrow 62, the backrest part 56 is connected in positively locking relationship to a slide element 64. The slide element 64 is disposed in fixed relationship with the seat.

The seat 10 shown in FIGS. 5 and 6 therefore involves the function of the seat 10 indicated in FIG. 1, with an immovable seat squab 12. It will be appreciated that it is also possible for the seat 10 shown in FIGS. 5 and 6 to be designed with a movable seat squab 12, corresponding to the operating principle illustrated in FIG. 2.

FIGS. 7, 8 and 9 diagrammatically show still another embodiment of the seat 10 with a seat squab 12 and a backrest 14. The seat squab 12 has portions 66, 68 and 80. The backrest 14 has portions 72 and 74. The portions 66 and 68 are rigidly connected to each other by means of a connecting element 76. The connecting element 76 is stationary.

The portions 68 and 70 of the seat squab 12 are rigidly connected to each other by means of a connecting element 78. A leg element 80 also projects rigidly away from the connecting element 78 and is pivotably connected to a second leg element 82 by means of a pivot axis 84. The portions 72 and 74 of the backrest 14 are pivotably connected by means of a connecting element 86. The second leg element projects pivotably away from the connecting element 86. A third leg element 88 also projects away from the connecting element 86. The second leg element 82 and the third leg element 88 are rigidly connected together at the connecting element 86 and are pivotable about the connecting element 86.

A spring element 94 is stressed between the end 90, which is remote from the connecting element 78, of the portion 70 of the seat squab 12 and the end 92, which is remote from the connecting element 86, of the backrest portion 72.

The third leg element 28 is pivotably connected by means of a pivot axis 96 to a pivot element 98 which is pivotably connected to the end 90 of the portion 70 of the seat squab 12.

In FIG. 7, the backrest 14 assumes a steep inclined position, with the portions 72 and 74 thereof assuming a forwardly directed lordosis position. In comparison, FIG. 9 shows a shallowly rearwardly inclined position of the backrest 14 in which its portions 72 and 74, being angled rearwardly, assume a kyphosis position. FIG. 8 shows an intermediate position of the backrest 14 between the lordosis position shown in FIG. 7 and the kyphosis position indicated in FIG. 9.

FIGS. 10 and 11 show another embodiment of the seat 10 in which the seat squab 12 is displaceable in the longitudinal direction of the seat and at the same time in respect of its inclination. In FIG. 10 the backrest 14 assumes a lordosis position while in FIG. 11 the backrest 14 assumes a kyphosis position. That is clearly shown by the front surface 18 of the backrest 14, as is shown in broken line.

The seat squab 12 of the seat 10 rests with its underside 100 on rollers 102 which project upwardly from the linear guide 40. Projecting downwardly from the underside 100 of the seat squab 12 are guide members 46 which are movable along the linear guide 42. The linear guides 40 and 42 are arranged in mutually facing relationship.

Guided movably along the linear guide 40 is a guide member 44 which is provided on the seat portion 50 of the frame part 48. The frame part 48 also has a backrest portion 52. The backrest portion 52 is fixedly connected to a backrest part 54 of the backrest 14. The backrest 14 has a second backrest part 56 which is pivotably connected to the backrest portion 52 by means of a pivot axis 60. The backrest part 56 is mounted with its lower edge which is remote from the pivot axis 60, on a slide element 64.

In FIG. 10 the seat squab 12 is in a position of being set back in the longitudinal direction of the seat and shallow in terms of its inclination. With the seat squab 12 in that position the backrest 14 or the front surface 18 thereof assumes a lordosis position. In comparison therewith FIG. 11 shows a setting of the seat 10 in which the seat squab 12 is set forwardly in the longitudinal direction of the seat, while the seat squab 12 at the same time assumes a position of being inclined upwardly at the front. With the seat squab 12 in that position the backrest 14 or the front surface 18 thereof assumes a kyphosis position.

It will be appreciated that the invention is not limited to the embodiments illustrated or diagrammatically indicated in the drawings but any other design configurations can also be adopted.

What is claimed is:

1. A seat comprising a displaceable seat squab (12) and a backrest which is displaceable in respect of its inclination between a convex lordosis position and a concave kyphosis position in dependence on the seat squab setting and which is set in a steep inclined position in a convexly forwardly curved configuration into an associated lordosis position and in a shallow inclined position in a concavely rearwardly curved configuration into an kyphosis position, characterized in that the seat squab (12) is displaceable in the longitudinal direction of the seat and that the backrest (14) is displaceable in dependence on the seat squab longitudinal setting in respect of its inclination, wherein in a set-back position of the seat squab (12) the backrest (14) is set steeply inclinedly into an associated lordosis position and in a set-forward position of the seat squab (12) the backrest (14) is set in a shallowly inclined position into a corresponding kyphosis position.

2. A seat as set forth in claim 1 characterized in that the backrest (14) is displaceable statically between lordosis and kyphosis positions.

3. A seat as set forth in claim 1 characterized in that the backrest (14) is displaceable dynamically between lordosis and kyphosis positions.

\* \* \* \* \*